W. J. FELDKAMP.
CAMPING UTENSIL.
APPLICATION FILED JULY 2, 1920.

1,378,846.

Patented May 24, 1921.

Inventor.
W. J. Feldkamp.
by
A. J. S. Dennison
atty

UNITED STATES PATENT OFFICE.

WILLIAM J. FELDKAMP, OF BRANTFORD, ONTARIO, CANADA.

CAMPING UTENSIL.

1,378,846.　　　　Specification of Letters Patent.　　Patented May 24, 1921.

Application filed July 2, 1920. Serial No. 393,528.

*To all whom it may concern:*

Be it known that I, WILLIAM J. FELDKAMP, a citizen of the United States of America, resident in the city of Brantford, in the county of Brant, Province of Ontario, Dominion of Canada, have invented certain new and useful Improvements in Camping Utensils, described in the following specification and illustrated in the accompanying drawings, that form part of the same.

The principal objects of the invention are to provide a form of camp utensil which may be carried in very small compass and may be handled with great ease and comfort under conditions found in camping where ordinary utensils are practically useless.

The principal feature of the invention consists in the novel arrangement of a clamping device upon the utensil whereby a temporary handle to suit the conditions of use may be very readily attached or detached.

In the drawings Figure 1 is a perspective view of a fork constructed according to my invention showing a temporary handle attached thereto.

Figure 1:
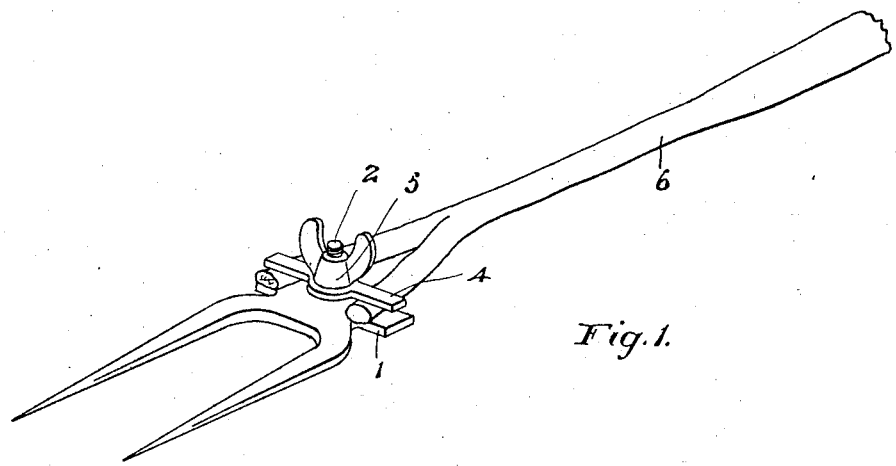
Figure 2:
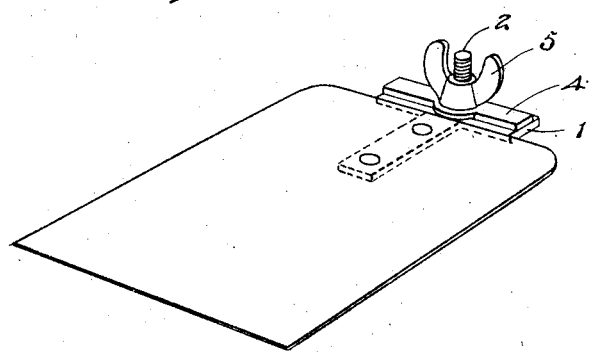
Fig. 2 is a perspective view of a pancake slide showing the clamp thereon.
Figure 3:
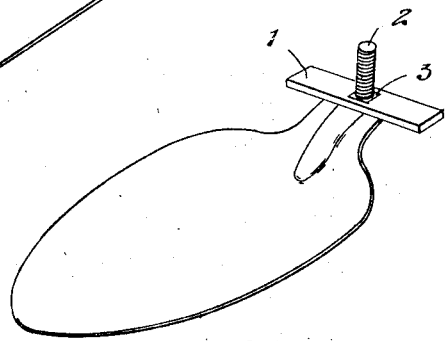
Fig. 3 is a perspective view of a spoon, a portion of the clamp being removed.

It is well known to prospectors, trappers, soldiers and others requiring to cook over the open fire the ordinary utensils for handling food are very difficult to handle and also that they are very awkward to pack and this invention eliminates these conditions by providing means for securing a temporary handle of any desirable length to the utensil.

In carrying out this invention, the utensil is formed with a transverse portion 1 which may be an integral part of the utensil or may be rigidly secured thereto by rivets or screws. A suitable bolt member 2 is secured mid-way of the length of the member 1 and the threaded stem preferably extends upwardly. The bolt is preferably formed with a squared shoulder 3 next to the head to fit in a correspondingly squared hole or the bolt may be riveted or brazed in so that it can not turn. A bar 4 of substantially the same length as the portion 1 is formed with a central hole which slips freely over the bolt and a suitable thumb nut 5 is threaded on the bolt.

The utensil thus formed is of very compact form and may be packed in a very small space, having no handle. When the utensil is required for use a green forked stick 6 or a piece of stick split at the end is placed between the member 1 and the bar 4 and the ends spread apart as far as possible. The bar 4 is then clamped tightly by means of the nut 5 and the handle is held securely and in such a manner that the utensil will not slip or turn.

Such a device enables the use of any length of handle desired so that it may be manipulated over an open fire with the greatest ease and comfort.

The invention may be readily applied to skillets and other forms of pans and dispenses with the cumbersome handles as a handle can always be cut from a tree or bush or from a stick.

What I claim as my invention is:—

A camping utensil having a transversely arranged bar portion rigid therewith, a bolt rigidly secured in the center of said bar portion, a clamping bar loosely mounted on said bolt and extending over the bar portion of the utensil, and a nut on said bolt adapted to secure a temporary handle between the clamping bar and transverse portion of the utensil.

WILLIAM J. FELDKAMP.